May 20, 1952 P. G. WINTER 2,597,272
MICROTHERMAL RESPONSIVE CONTROL SYSTEM
Filed May 7, 1948 3 Sheets-Sheet 1

INVENTOR.
PAUL G. WINTER.
BY Lockwood, Goldsmith & Galt,
ATTORNEYS.

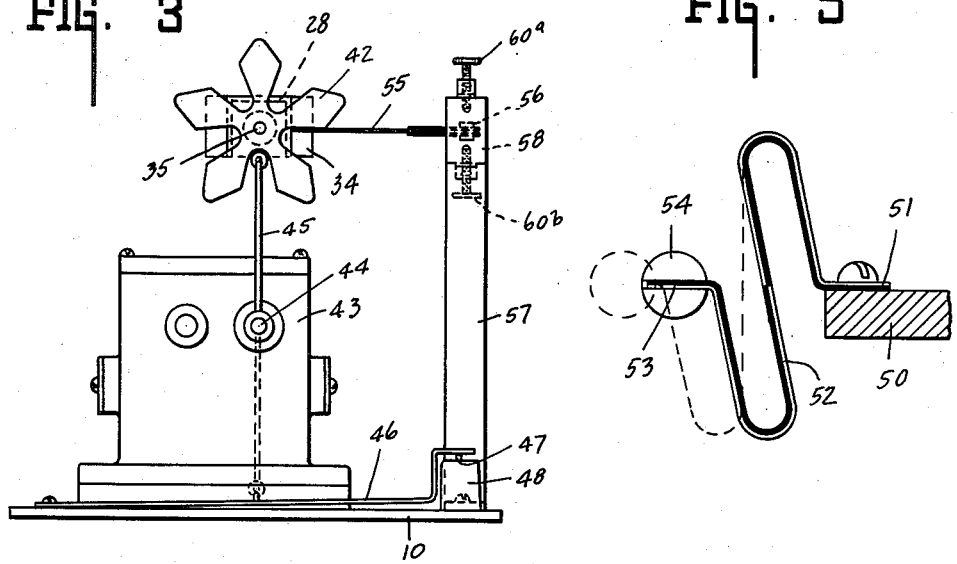

Patented May 20, 1952

2,597,272

UNITED STATES PATENT OFFICE 2,597,272

MICROTHERMAL RESPONSIVE CONTROL SYSTEM

Paul G. Winter, Indianapolis, Ind.

Application May 7, 1948, Serial No. 25,715

5 Claims. (Cl. 73—339)

This invention relates to a micro-thermal responsive device.

The chief object of this invention resides in utilizing small changes of temperature to initiate electrical impulses for control and/or indicating purposes, the invention being peculiarly responsive to temperature changes of small fractions of a degree.

Another object of this invention resides in the ability thereof to respond substantially uniformly for such small temperature increments, such as hereinafter pointed out, and over a comparatively wide range such as from 30 or 20 below zero to 100 to 120 degrees above Fahrenheit, by way of example only.

One chief feature of the invention resides in the thermal displacement of distributed balanced masses whereby the effects of small temperature increment changes are multiplied for control purposes.

Another chief feature of the present invention resides in the cyclic feature of operation whereby the device can be effective over a wide range and sensitive to each of the increments included within that range.

Herein the invention is exemplified as embodying contact devices and a motor but in its broad sense photo-electric devices and/or "step" relays respectively may be utilized.

Another feature of the present invention is that after each increment of correction to bring the thermally displaced masses into balance, the entire balance member is free to assume its so-called corrected position.

A further feature of the invention is that upon power failure substantially all the elements hold their relative positions by reason of the mechanical latching except insofar as certain of the elements respond to the variable medium or force. For example, the temperature responsive elements respond as temperature changes during the power failure. Therefore, there is a further feature involved, to wit, that the thermal elements respond regardless of the power failure. Upon reestablishment of the power the indicators immediately are actuated to indicate the then present thermal condition.

A further feature of the invention is that the structure records immediately at the time of actuation the variable condition of force and that there is substantially no time delay.

Other objects and features of the invention will be set forth more fully hereinafter.

The full nature of the invention will be understood from the accompanying drawings and the following description and claims:

In the drawings—

Fig. 3 is an end elevation of the left end of the invention, see Fig. 1.

Fig. 4 is a transverse sectional view taken on line 4—4 of Fig. 1 and in the direction of the arrows.

Fig. 5 is a plan view of a bimetallic thermal element of uniform temperature-deflection type and wherein the deflection is of linear type.

Figures 1, 2:
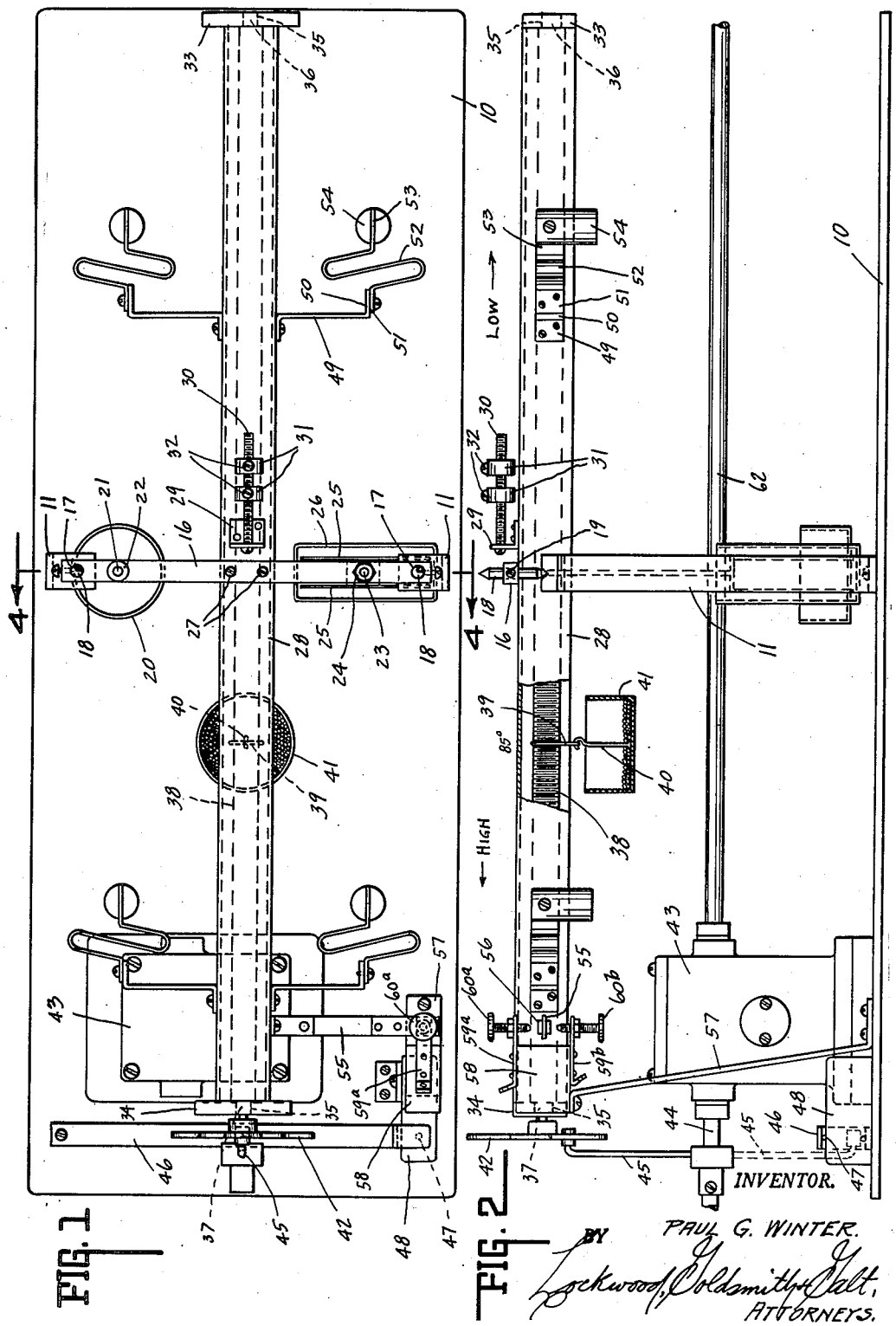
Fig. 1 is a top plan view of the preferred embodiment of the invention.
Fig. 2 is a front elevation, parts being broken away to show other parts in greater detail.

In Figs. 1 to 4 of the drawings there is illustrated more particularly the major physical portions of the preferred embodiment of the invention. In said figures 10 indicates a base which intermediate its ends includes two spaced uprights 11. Each is segmentized as shown in Fig. 4 at 12 for length adjustment, if desired.

Each of said standards carries an upper bearing member 13. One has a knife groove 14 therein. The other mounts a pin 15 with conical hole 15ᵃ therein. A bar 16 at each end overlies the adjacent bearing member and said end is socketed at 17 to adjustably and reversibly mount the conical end pin 18 secured by clamp screw 19.

It will be obvious first that for wide ranges of temperature the length of the bar 16 will vary. The socket bearing (15ᵃ) seated pin 18 being fixed, as it were, the other pin 18 will properly move to and fro in V groove 14 for bar length variation.

This invention is predicated on a balanced mechanism. Pins 18 may each be adjusted relative to bar 16 and bearings 13 each may be adjusted at 12 relative to base 10 so that balance bar 16 is positionable in a horizontal plane regardless of slight variations in departures therefrom with respect to the base 10 which normally should be parallel to that plane if its support (not shown) had a truly horizontal surface. Thus the invention is adjustable for extreme accuracy in positioning of bar 16.

A weight in cup form 20 having the required amount of mass therein, such as lead shot, is suspended from bar 16 by rod 21; same being adjusted by nuts 22, as shown. The rod terminates in eye 21ᵃ and connector 20ᵃ of the cup pivots therein if necessary. This weight is disposed adjacent one bearing and herein bearing 13—14 and is the stabilizing weight for adjusting the center of gravity.

Opposite from the bar center, that member 21 is therefrom, is another rod 23 adjustably connected to the bar by nuts 24. Said rod terminates at 23ª in a vane 25 nested in a receptacle 26 herein carried by an upright 11 as at 26ª. A liquid (not shown) in this vessel, resists vane movement to and fro and serves as a dampening means, thus restricting multiple oscillation of the bar 16 upon its pivots.

The bar 16 has suitably secured to its under face as at 27 a beam 28 herein shown in the form of an inverted channel, see Fig. 4. Suitably secured to the upper face thereof and close to the bar 16 is bracket 29 that supports threaded arm 30 parallel to the beam. Same may carry one or more internally threaded balance weights 31 locked as at 32 thereto.

This counterbalance (single or multiple weights) is used to bring the entire balanced mass into equilibrium at some definite temperature, preferably at a temperature midway between the limits of the desired range.

The ends of the channel 28 are suitably closed as at 33 and 34 each apertured at 35 to take the ends 36 and 37 respectively of a screw structure 38 and rotatably support same in said end members.

A member 39 may be in the form of an apertured plate but herein, see Fig. 4, comprises a hook that rides the upper threaded surface of said screw. The same terminates in an eye in which is mounted the hook of member 40 carrying cup weight 41 having the requisite amount of mass (lead shot) therein. Obviously when the screw is rotated this movable weight is moved toward the cross bar 16 or away from same in accordance with the direction of screw rotation and in an amount depending upon the amount of that rotation.

The left hand end 35 of screw 38, see Figs. 1 and 2, is extended and mounts star wheel 42, see also Fig. 3. Juxtapositioned thereto is an electric motor and reduction unit 43 carried by base and having shaft 44 carrying arm 45 adapted to engage in its rotation one tooth of star wheel 42. Thus for each rotation of shaft 44 in either direction, screw 38 will be rotated in a corresponding direction an amount equal to 360 divided by the number of teeth on the star wheel.

Herein five are shown. If the pitch of screw 38 is 20 to the inch it will require 100 successive contacts between arm 45 and wheel 42 to effect displacement of one inch of weight 41.

Herein there is pivoted to the base 10 in the path of arm 45 a switch control member 46, same being operatively associated with exposed end 47, see Fig. 3, of a switch structure indicated generally by numeral 48. This switch is a motor circuit cutoff switch, so that the motor is cyclically, reversibly and intermittently operable for reasons to be set forth more fully hereinafter. Accordingly screw 38 is rotated intermittently as required.

Reference will now be had to Figs. 1 and 2. The position of weight 41 therein corresponds by way of example to a temperature of approximately 85° F. for a −20 to 120° F. range. When it is near the left end of the screw it corresponds to 120 degrees Fahrenheit, as aforesaid, and when near the right end of the screw it corresponds to a temperature of −20 degrees below zero.

The thermal active elements are illustrated in a position corresponding to a temperature about zero. Since they are identical a description of one will suffice for all. While four, in opposed pairs, are illustrated herein additional or lesser elements may be applied to the beam as desired or required.

The element may take any desired form. One form comprised a thermal bar disposed transversely of the beam and carrying a weight at each end. Same, however, when responsive to temperature change deflected on the arc of a circle and not linearly. Accordingly there herein is illustrated the preferred structure which moves the weight parallel to the beam and substantially uniformly for each increment of temperature change.

Each such elemental structure comprises an arm 49 projecting transversely of the beam and suitably secured thereto. On the transverse end 50 there is secured in parallel relation to the beam one end 51 of a Z-shaped bimetallic thermal element 52. The other end 53 is disposed in substantial alignment with said end 51 for any temperature condition within the present selected normal range of said element which as stated is from −20 or −30 degrees to 110 or 120 degrees Fahrenheit. The deflection against temperature, for the range specified, is substantially a straight line function.

To the free end 53 of each bimetallic thermal member there is rigidly secured the weight 54, the latter being slotted as shown to receive said end. In Fig. 1 it will be noted that these units are disposed in opposed pairs and in this form there is at least one pair secured to the beam at each side of the cross bar. All elements are similarly directed so that as shown in Fig. 1 as the temperature increases all the weights advance to the right and to a like extent and in planes parallel to the beam. In certain instances but one element need be employed.

Reference will now be had to Fig. 5 wherein one such thermal element is shown enlarged. Such an element is sold commercially by W. M. Chase Co. of Detroit, Michigan. In this figure the solid black lines indicate the low temperature and the white block portions the high temperature portions of the bimetallic strip, and the center junction of the four portions constitutes the point of reversal of deflection and same is in alignment with the aligned elements.

Reference will now be had to Figs. 1 to 3 inclusive. Beam 28 adjacent the star wheel mounts an arm 55 and same supports contact 56. To base 10 is suitably secured upright 57 which carries switch base 58 of insulation character. Terminal members 59ª and 59ᵇ are secured to said block and adjustably mount contacts 60ª and 60ᵇ respectively. These are disposed in aligned relation with contact 56 therebetween.

The foregoing comprises a selective reversing switch and motor circuit initiating switch. One form of operation may be briefly outlined as follows: The several adjustments are effective so that the beam is balanced for the then effective temperature to which same is subjected. As the temperature changes the weights shift accordingly. This unbalances the beams.

Such unbalance closes one of the motor actuating relay circuits at their reversing switch. The motor is then energized in the proper direction to rotate arm 45 to engage and rotate star wheel 42 one increment of correction. Upon the completion of the rotation of arm 45 switch control member 46 is engaged to open the lock up relay circuit.

In the interval that the motor is energized, the screw 38 is rotated to move weight 41 to correct the thermal unbalance. If this be insufficient, of course, contact 56 remains in contact with the adjacent contact and a second and successive rotation of arm 46 is effected until balance of the entire mass is restored. When restored, contact 56 is in open circuit position. The beam tilting obviously is dampened by the blade-vessel means. Weight 20 serves to stabilize the structure. Thus a time lag is effected herein sufficient for the corection factor to be applied. Time lag is inherent also in the arm-star wheel drive, see Fig. 3.

The foregoing mechanism may be suitably correlated for control purposes to other mechanism. Such is suitably and diagrammatically illustrated in Fig. 6.

Figure 6:
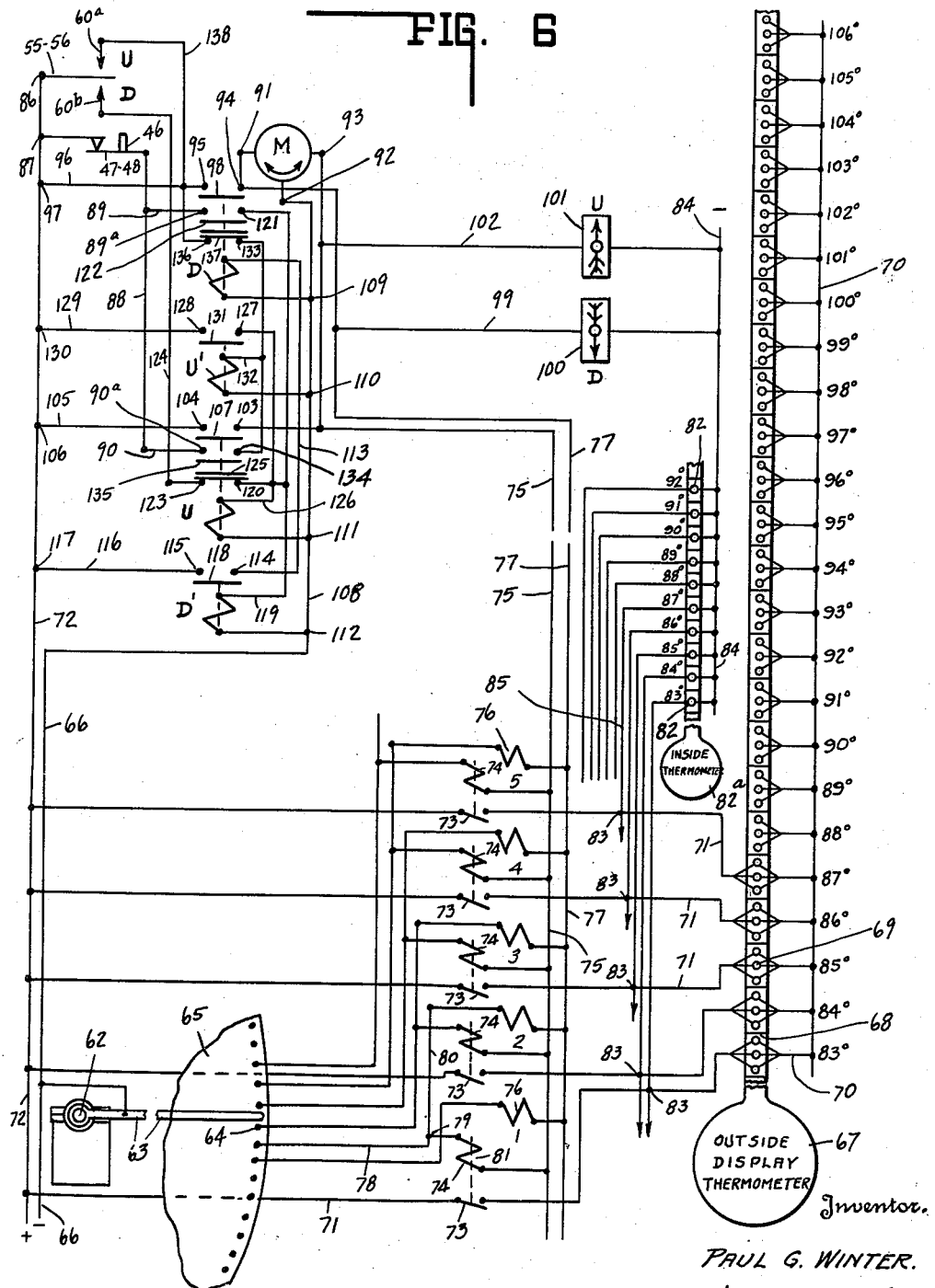
Fig. 6 is a wiring diagram of a temperature indicating system and its control, same being responsive to that part of the invention disclosed in Figs. 1 to 4 aforesaid.

Of course, a direct control can be applied to motor driven shaft 44, see Fig. 2, by having a pinion thereon mesh with a gear carried by shaft 62, see Figs. 2 and 6, mounting a pointer adjacent a stationary circular scale 65. Thus motor operation changes the indicator scale-relationship. If desired such indicator and scale can be mounted on the screw and beam and directly correlated to screw rotation or weight 41 position.

In Fig. 2 the motor-reduction drive includes another and slow speed shaft 62. This shaft mounts an arm 63, see lower left hand corner of Fig. 6, and said arm is motor oscillated over contacts 64. Since the position of weight 41 in Figs. 1 and 2 corresponds to about 85° the arm 63 is disposed between contacts 64 corresponding to 85 and 86 degrees.

These contacts 64 are displaced arcuately about two angular degrees thus providing in a circle upon member 65 one hundred and eighty or so divisions. Herein arm 63 is grounded or constitutes the common return 66 of an electrically operated indicating device.

Herein such device comprises, for example, a thermometer representation 67 that can be applied to the outside of a building and may be sixty to eighty feet in length. The representation is segmentized as at 68 and a red light bulb or a red glass backed by a white bulb 69 is provided for each segment. Each bulb is grounded or has a common return as at 70. Each bulb is connected by a line 71 to a supply line 72 common to the control elements and all bulbs.

In each line 71 is a control switch 73 which normally is disposed in open position and is relay closable and held closed by a mechanical latch, not shown. The closing relay winding is indicated at 74. There is a relay for each bulb 69 and all windings are commonly connected to common line 75.

Adjacent the winding 74 is an unlatching winding 76. All windings 76 have one terminal connected to common line 77. Line 78 from any one contact 64 upon member 65 is branched as at 79 and 80. Line 79 leads to the other terminal of winding 74 while line 80 leads to the unlatching winding 76 of the next adjacent (higher unit temperature corresponding) relay structure.

The movable core 81 of each relay is controlled by its latching relay and the closing relay 74, the latter closing switch 73 and the former opening same. The multiple connection aforesaid insures maintenance of all bulb circuits below that of the corresponding temperature circuit and of course the corresponding temperature bulb circuit also is held closed.

When arm 63 swings and contacts the next higher temperature contact 64 the next temperature indicating bulb will be energized. When arm 63 swings in the reverse direction upon temperature drop each immediate higher temperature indicating bulb circuit will be automatically opened.

Note the bulb circuits are electrically independent of the latch in relay circuits. Whenever desired there may be included as many indicators as desired. For example, if the outer thermometer indicator is exteriorly positioned, there may be positioned interiorly of the building and on each floor a miniature (say 6 to 8 feet) of the larger unit. 82ª indicates the miniature unit having smaller bulbs 82 commonly connected to common line 84. Each bulb has connection 85 at 83, to the corresponding line 71 between switch 73 and bulb 69. Whereas bulb 69 is shown singular and circular it may be of linear type or comprise a plurality of multiple connected linearly disposed bulbs.

Reference will now be had to the master control circuit as shown diagrammatically in the upper left hand portion of Fig. 6 wherein contacts 60ª and 60ᵇ are indicated in spaced relation with finger 55—56 disposed therebetween, see also Figs. 1 and 2. Line 72 is connected thereto at 86.

Microswitch 47—48, controlled at 46, is also connected to line 72 at 87. A line 88 from this switch is branched at 89—90 to contacts 89ª and 90ª of two switches each of three gang type and each controlled by a relay designated D for falling temperatures and U for rising temperatures. Operatively associated therewith are corresponding relays designated D' and U'. The motor is designated by the letter M in Fig. 6. It is of reversible type.

Motor M has three terminals 91, 92 and 93. The terminal 91 is connected to contact 94 adjacent contact 95 connected by line 96 to line 72 at 97. A bridging member 98 is adapted to open and close a circuit across contacts 94—95. Common line 77 of the unlatching windings is in multiple with motor terminal 91 and controlled by switch bar or member 98.

Also in multiple therewith is line 99 leading to a signal 100 connected in turn to return line 84. This signal, as illustrated indicates the temperature is falling. A rising temperature indicator 101 is connected to said return line 84 and by line 102 to line 75 aforesaid, the latter being in multiple with motor terminal 93, all being connected to contact 103. Spaced therefrom is contact 104 connected by line 105 to supply line 72 at 106. Bridging bar member 107 controls this circuit.

The mid-terminal 92 of said motor M is connected by line 108 to line 66, the return line. Relay D is connected to line 108 as at 109, relay U' thereto as at 110, relay U thereto as at 111, and relay D' thereto as at 112.

Relay D is connected by line 113 to switch contact 114 disposed adjacent contact 115 connected by line 116 to supply line 72 at 117. This switch is bridged by bar 118 controlled by relay D' in turn connected by line 119 to contacts 120 and 121, the latter being positioned opposite contact 89ª, same being bridgeable by bar 122 controlled by relay D'.

Contact 120 is disposed adjacent contact 123 connected by line 124 to contact 60ᵇ aforesaid, said contacts 120—123 being bridgeable by bar 125 controlled by relay U aforesaid. The latter is connected as stated to line 108 at 111 and is also connected by line 126 to contact 127 disposed adjacent contact 128 connected by line 129 to supply line 72 at 130. These contacts are bridgeable by bar 131 controlled by relay U'.

This relay U' as stated has one side connected to line 108 at 110. The other side is connected by line 132 to contacts 133 and 134 controlled respectively by relays D and U. Contact 134 is disposed adjacent contact 90ª aforesaid connected by line 90 to line 88 and bridging bar 135 is controlled by relay U. Contact 133 is disposed adjacent contact 136 bridgeable by bar 137 controlled by relay D aforesaid. Contact 136 is connected by line 138 to the "up" contact 60ª.

When contact 60ª is engaged by contact finger 55—56 current is supplied to line 138 across normally closed switch 136—137—133 to relay U'. This closes switch 128—131—127 to energize solenoid U to open switch 123—125—120 and simultaneously close switches 90ª—135—134 and 104—107—103. Opening switch 123—125—120 opens the circuit between contact 60ᵇ and relay D' thus locking it out, while relay U' is energized even if switch 55—56 and 60ᵇ are closed.

However, closing switch 104—107—103 supplies energy for motor rotation counter-clockwise and arm 63 rotation similarly which effects closing of the next higher temperature unit indicating circuit when the arm contacts the corresponding contact 64 on dial member 65.

When, however, the temperature falls and arm 55—56 contacts terminal 60ᵇ, the then normally closed switch 123—125—120 supplies energy to relay D' to close switch 115—118—114 which supplies energy to relay D to open switch 136—137—133, which has no electrical effect since finger 55—56 does not contact terminal 60ª, and to close switch 95—98—94 to close the circuit 91 to motor M at contact 94 for clockwise rotation thereof to energize the latching opening relay 76 corresponding to the higher temperature unit to extinguish the bulbs 69 and 82 corresponding thereto.

The motor circuit in each instance, after being thus initiated, is maintained closed for one rotation of arm 45, see Figs. 1 to 3, or until the arm opens the microswitch 46—47—48, see Figs. 2, 3. Then the motor circuit is broken but the latch-in relays are held in status quo until a new signal is supplied.

The switches 89ª—122—121 and 90ª—135—134 are motor circuit maintaining switches for selectively energizing motor M as long as the microswitch 46—47—48 remains closed, which of course, is for one rotation of shaft 44. If motor M has a rated speed of 5 R. P. M., the duration of contact for each cycle of operation in either direction will be 12 seconds and if the reduction unit has a 900 to 1 ratio the shaft 62 rotates but 2 degrees for each revolution of the screw 38.

*Master control relay operation*

This master relay control shown in Fig. 6 consists of four magnetically operated relays designated D, U, D', and U'. Relay D has one normally closed contact 133—136—137, one normally open contact 89—120—122, and one normally open contact 94—95—98. Relay U has one normally closed contact 120—123—125, one normally open contact 90ª—132—135, and one normally open contact 103—104—107. Relay D' has one normally open contact 114—115—118.

Relay U' has one normally open contact 127—128—131.

At the instant of contact between 56 and 60ª (in order to bring the beam to center position after having been displaced due to an increase in temperature), the circuit is completed as follows: Line 72 to switch 55—56 to contact 60ª and by line 138 through switch 136—137—133 to line 132 through relay U' back to line 66. This causes relay U' to close its contacts 127—128—131, causing current to flow as follows: From lines 72—129 to contacts 128—131—127—126 through relay U to lines 111—66. This causes relay U to close.

Closing of relay U opens normally closed contacts 120—123—125 thus opening the circuit starting from 60ᵇ through 124 to 123 to D'. Closing of relay U also closes contacts 90ª—135—125. This closes a circuit as follows: 72—87—47—48—90—90ª—135—125—132 through relay U' to 66 thus locking in relay U' even if contacts 56 and 60ª are subsequently opened. This circuit remains closed until opened by depressing member 46 of the microswitch.

Closing of relay U also closes contacts 103—104—107, establishing three parallel circuits as follows: The first circuit is as follows: 72—105—104—107—103—93 through the motor to 92 to 66 causing the motor to operate in the "up" direction. The second circuit is as follows: 72—105—104—107—103—102 through 101—84 (same as 66). The third circuit is as follows: 72—105—104—103—75 to the common side of all closing coils 74 of the "latch in" relays.

During the up rotation of the motor, contact is made my contact arm 63 with one of the contacts such as 64 thus completing the circuit through the closing coil of that latch-in relay to 66. This relay remains "latched in" mechanically until unlatched by the excitation of the unlatching relay coil 76.

Corresponding operations are performed by relays D' and D to accomplish corresponding motor operation and the closing of the circuit to line 77 which is the common line of all unlatching relay coils 76. The advantages of this form of relaying the various circuits is that no current is broken at the delicate contact points 60ª and 60ᵇ. The circuit is opened at the microswitch.

Only one "latch in" relay coil is excited at any one time and then only while contact is made between contact arm 63 and contact 64 while the motor is operating. In the case of power failure, the illuminating thermometer lights go out and all control circuits are inoperative. Due to the mechanical latch-in relays all lighting circuits to the display thermometer remain established as they exist at the time of power failure.

If a temperature change has occurred during the power failure period, contact has been established between 56 and 60ª or 60ᵇ. Upon the re-establishment of power the entire device will again function until the beam actuated by the bi-metal strips has been brought to a neutral position with the contact 56 mid way between contacts 60ª and 60ᵇ thus indicating the temperature at that time.

Various relaying methods and combinations of relays and contacts may be employed to obtain the desired results and properly limit current densities on the contacts.

The foregoing disclosure in Fig. 6 is but one example, as stated, for the use of this device or master temperature responsive control. As initially stated herein, instead of direct contact an electric eye circuit system may be employed which in lieu of contacts 60a and 60b and members 55 and 56 may have two independent light beam circuits selectively "blocked out" when the beam is thermally unbalanced, each such "blocked out" circuit effecting controls equivalent to that shown in Fig. 6 or two light sensitive cells may be used in lieu of contacts 60a and 60b and finger 55 may carry a light source to selectively energize such replacement cells and similarly control selective circuits of the general character illustrated in Fig. 5.

While the invention has been described herein as specifically directed to an advertising or display device it is also applicable for indicating at a distance critical temperatures such as required in dangerous chemical reactions wherein it is desired to have the operating or controlling personnel at a sufficiently safe distance at all times or for temperature control purposes.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A thermally responsive device comprising in combination, a pair of spaced apart supporting standards, a cross-bar supported thereon by friction reducing means, a balanced beam supported on said cross-bar, a depending rigidly mounted weighted arm for stabilization on said cross-bar, a thermally disposable mass carried by said beam and displaceable longitudinally thereof, counter-balancing means carried by said beam and means for moving said beam carried counter-balancing means longitudinally of said beam in opposition to said thermally displaceable mass in periodic pre-determined movements and means for effecting the operation of said moving means controlled by the movement of said beam.

2. A thermally responsive device comprising in combination, a balanced beam, means for supporting said beam intermediate of its ends including friction reducing bearings, a thermally displaceable mass carried by said beam and displaceable longitudinally thereof, counter-balancing means displaceable with said beam the effectiveness of which increases with the angle of displacement of said beam, a screw rotatably carried by said beam, a weight adjustable longitudinally of said beam by the rotation of said screw, a reversible rotary electric motor for driving said screw, driving means for said screw and means operated by said motor for periodically operating said driving means in predetermined steps.

3. A thermally responsive device comprising in combination, a balanced beam, means for supporting said beam intermediate of its ends, including frictional reducing bearings, a thermally displaceable mass carried by said beam and displaceable longitudinally thereof, counter-balancing means displaceable with said beam, the effectiveness of which increases with the angle of displacement of said beam by said mass, a longitudinally disposed screw rotatably supported on said beam, a thread engaging member on said screw and a weight carried by said thread engaging member, a reversible rotary electric motor, driving means for said screw, means operated by said motor for periodically operating said driving screw in predetermined steps, a contact member driven by said motor in stepped relation to the stepped drive of said screw and a plurality of contacts in spaced relation adapted to be engaged by said contact member.

4. A thermally responsive device comprising in combination, a balanced beam, means for supporting said beam intermediate of its ends including friction reducing bearings, a thermally displaceable mass carried by said beam and displaceable longitudinally thereof, counter-balancing means displaceable with said beam, the effectiveness of which increases with the angle of displacement of said beam by said mass, a longitudinally disposed screw supported on said beam, a thread engaging member carried by said screw and a weight carried by said thread engaging member, driving means for said screw and a reversible rotary electric motor having means intermittently engaging said screw driving means and moving the same a predetermined distance, a contact member carried by said motor and a plurality of spaced apart contacts engageable by said contact member, the spacing of said contacts being coextensive with the movement of said screw driving member and contact means carried by said beam for controlling the circuit of said motor.

5. A thermally responsive device comprising in combination, a pair of spaced apart supporting standards, a supporting bar rockably supported thereon on friction reducing pivots, a balanced channel bar supported intermediate of its ends on said supporting bar, a thermally displaceable mass supported on said beam and thermally displaceable longitudinally of said beam, a balancing weight supporting rigidly mounted rod depending from said supporting bar, a screw rotatably supported on said balanced beam, a weight supporting thread engaging member supported on said screw, a driving star wheel connected to said screw, a reversible rotary motor, means operated by said motor for periodically engaging the fingers of said star wheel and contact members carried by said beam for controlling the operation of said rotary motor.

PAUL G. WINTER.

REFERENCES CITED

The following references are of record in the file of this patent:

UNITED STATES PATENTS

| Number | Name | Date |
| --- | --- | --- |
| 804,947 | Hapgood | Nov. 21, 1905 |
| 1,099,416 | Yates | June 9, 1914 |
| 1,181,226 | Kenyon | May 2, 1916 |
| 1,443,395 | Tommasello | Jan. 30, 1923 |
| 1,719,482 | Mills | July 2, 1929 |
| 1,952,171 | Jones | Mar. 27, 1934 |

FOREIGN PATENTS

| Number | Country | Date |
| --- | --- | --- |
| 4,086 | Great Britain | May 20, 1817 |